United States Patent

Roberts et al.

[15] 3,679,215

[45] July 25, 1972

[54] TAPE RECORDER

[72] Inventors: William E. Roberts, Palos Verdes Peninsula, Calif.; Gerald J. Barry, Fort Wayne, Ind.

[73] Assignee: The United States of America as represented by the Secretary of the Navy

[22] Filed: Feb. 3, 1967

[21] Appl. No.: 617,004

[52] U.S. Cl. ..........................274/4 D, 179/100.2, 242/193, 242/201

[51] Int. Cl. ..........................G11b 5/48, G11b 5/78

[58] Field of Search .................242/55.13 D, 55.12 C, 55.14, 242/57; 179/100.2 CA, 100 C, 100 MD; 274/4, 11

[56] References Cited

UNITED STATES PATENTS

| | | | |
|---|---|---|---|
| 2,996,264 | 8/1961 | Bygdnes | 242/55.13 D |
| 3,051,405 | 8/1962 | Lyon | 242/57 X |
| 3,115,314 | 12/1963 | Manley et al. | 242/57 X |
| 3,294,332 | 12/1966 | Miville et al. | 242/55.14 X |

*Primary Examiner*—Benjamin A. Borchelt
*Assistant Examiner*—H. A. Birmiel
*Attorney*—G. J. Rubens and Henry Hansen

[57] ABSTRACT

A tape recorder having a motor with a shaft, a pair of tape storage reels which are mounted rotatably on the shaft and are mechanically interconnected by constant torque springs, a tape drive capstan fixed to the shaft for withdrawing magnetic tape from either of the tape storage reels, and magnetic recording heads positioned immediately adjacent the grooved periphery of the capstan for erasing, recording, and reading recorded information on a plurality of tracks carried by the magnetic tape. Circuitry is provided to cause the recorder to continuously record data without rewinding at a low speed, the oldest recorded data being continuously erased during the recording of new data; and remotely actuatable apparatus is provided to cause the recorder to play back and transmit the recorded data at high speed in reverse sequence.

14 Claims, 6 Drawing Figures

INVENTORS
WILLIAM E. ROBERTS
GERALD J. BARRY

BY

ATTORNEY

INVENTORS
WILLIAM E. ROBERTS
GERALD J. BARRY

BY [signature]
ATTORNEY

PATENTED JUL 25 1972

3,679,215

SHEET 3 OF 3

INVENTORS
WILLIAM E. ROBERTS
GERALD J. BARRY

BY [signature]
ATTORNEY

TAPE RECORDER

BACKGROUND OF THE INVENTION

The invention relates generally to a magnetic tape recorder and, more particularly, to a tape recording system for continuously recording acoustic data upon a length of tape and for playing back and transmitting the recorded data upon remote command.

There has been a need for a magnetic tape recorder of compact, rugged and lightweight construction which is capable of the precision recording and playing back of data for use in data gathering probes such as missiles, satelites, airborne computer equipments and particularly underwater acoustic noise monitoring systems. It is generally considered necessary for the precise duplication of data that the magnetic tape be driven past magnetic recording and reading elements at a constant and unvarying rate of speed and that any tension supplied to the tape be constant and unvarying to prevent fluctuations or variations of tape travel speed. Known recorders of the driven storage reel type require complex drive methods for driving the reels at a continually varying rate so that the tape speed adjacent the recording and reproducing elements remains essentially constant. Further, various arrangements of spring loaded idler wheels are generally considered necessary to provide tape tension and pressure between the tape and the recording elements. In known apparatus utilizing a tape drive capstan, complex means is conventionally provided for driving the take-up reel at the necessary rate to store the tape being fed thereto, and other apparatus is provided to maintain the necessary tape tension between the take-up and storage reels. Complex mechanical or electrical switching mechanisms are conventionally required when the direction of tape travel in these mechanisms is to be reversed. Further, various arrangements of belts, pulleys, gears, wheel trains and the like are usually linked between the prime mover and both the tape drive capstan and the tape storage reels. These linkages are subject to failure and render precision speed control difficult to attain. The known air or vacuum systems for maintaining tape tension are complex and expensive and are not easily fabricated in small and compact configurations. Known recorders utilizing endless magnetic tapes are complex and are difficult to fabricate and maintain.

SUMMARY OF THE INVENTION

It is a general purpose of this invention to provide a compact, lightweight, ruggedly constructed tape recorder which is more easily fabricated and serviced than are known tape recorders and which has a capability for continuously recording and playing back sensed data at precisely controlled tape speeds to enable precision duplication of the data. Briefly, this is accomplished by providing a pair of tape storage reels coaxially mounted and drivingly interconnected by a constant torque springs a tape drive capstan fixed to the shaft of a motor which capstan serves to withdraw tape from either of the storage reels. Magnetic recording heads are positioned directly adjacent the tape carrying periphery of the capstan, and control circuitry selectively causes the heads to record, to erase and/or to read.

DESCRIPTION OF THE PREFERRED EMBODIMENT

Figure 1:
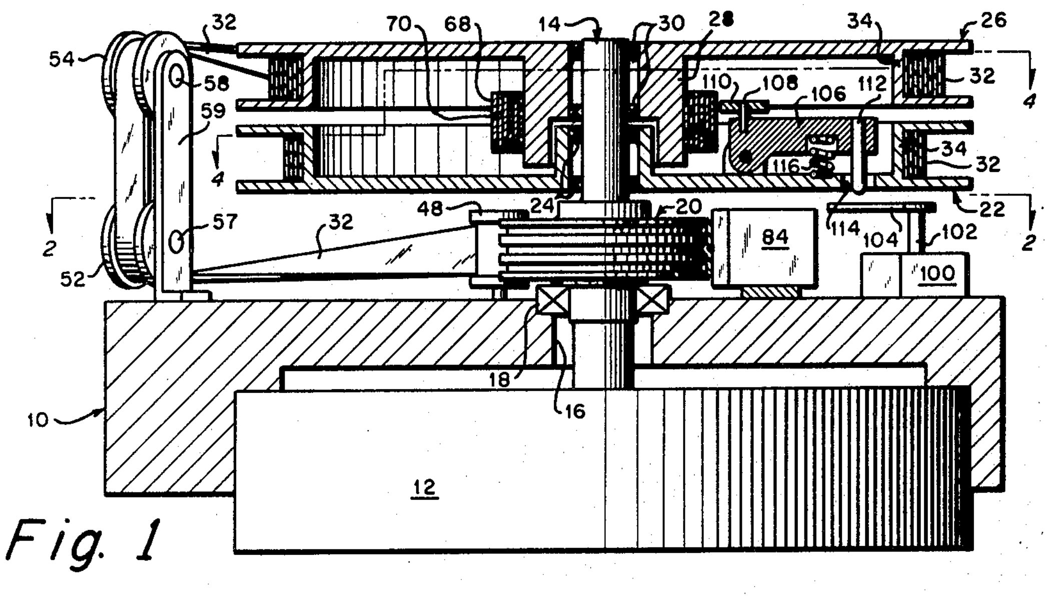
FIG. 1 represents an elevation in diametrical cross section of an embodiment of a tape recorder according to the invention.

Referring now to FIG. 1, the tape transport mechanism of the tape recorder includes a base 10 to which is fixed a motor 12 having its rotatable rotor shaft 14 extending therefrom and through an aperture 16 in the base 10. The shaft 14 is supported for rotation relative to the base 10 by a bearing 18 carried by the base 10. A cylindrical tape drive capstan 20 is coaxially fixed to the shaft 14 for rotation therewith. An inner tape storage reel 22 is supported coaxially by a bearing 24 mounted rotatably about the shaft 14 whereby the reel 22 is capable of rotation independent of the shaft 14. An outer tape storage reel 26 includes an axial hub 28 which is positioned adjacent and extends toward the reel 22 for a purpose hereinafter set forth and is supported by a bearing 30 which in turn is mounted rotatably about the extended end of shaft 14.

Figure 2:
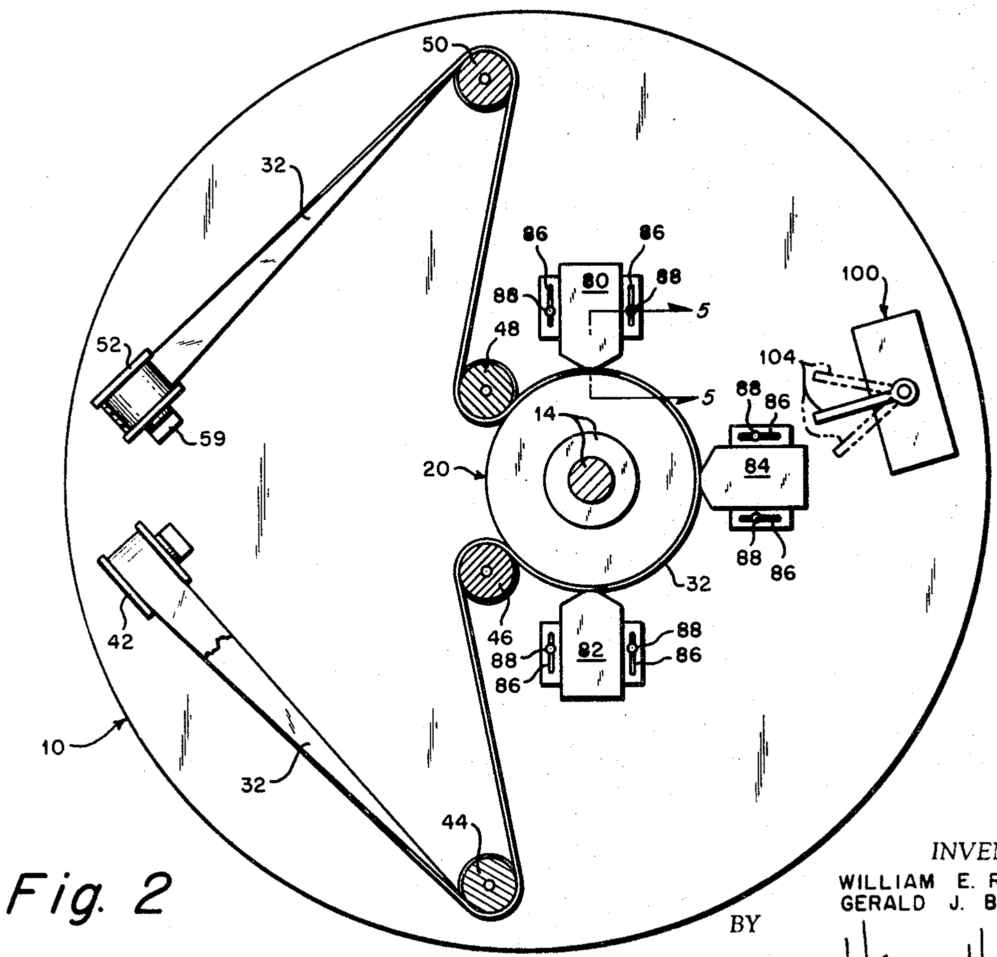
FIG. 2 represents a plan view of the tape recorder of FIG. 1 taken substantially along line 2—2 thereof.
Figures 3, 5:
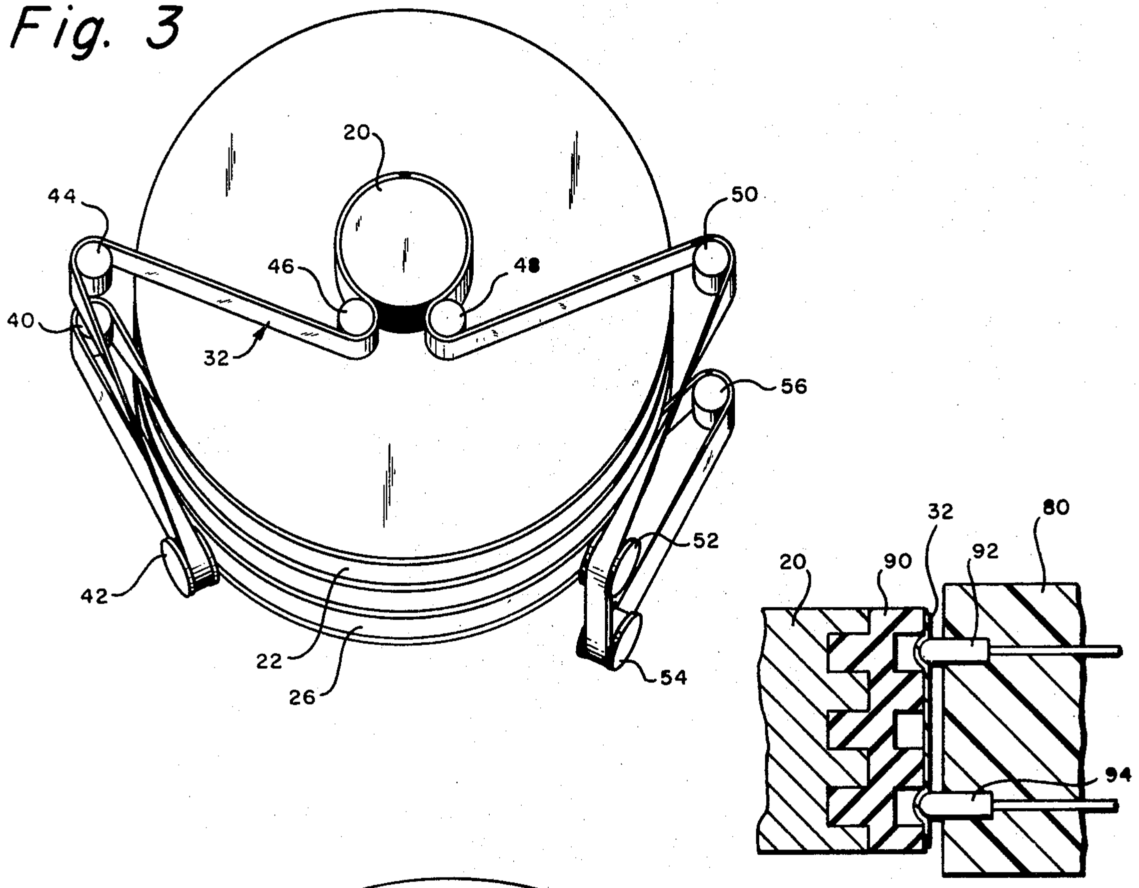
FIG. 3 represents an isometric view from beneath of the capstan, reels, and associated tape-guiding rollers of the tape recorder of FIG. 1.
FIG. 5 represents an enlarged cross-sectional view of a portion of the apparatus of FIG. 2 taken substantially along line 5—5.

A length of magnetic tape 32 having a plurality of information tracks has its ends fixed to respective tape bearing peripheries 34 of the inner and outer reels 22 and 26. The tape 32 is so wound upon itself upon the reels 22 and 26 that tape 32 tends to collect upon reel 22 when this reel is rotated clockwise as observed from the reel 26 side thereof. The tape 32 tends to collect upon reel 26 when this reel is rotated counterclockwise as observed from points beyond the extended end of shaft 14. Assuming the capstan 20 as illustrated in FIG. 3 to be rotating clockwise, (counterclockwise in FIG. 2), the tape 32 is withdrawn from the inner reel 22 and passes about idler rollers 40, 42 and 44 to idler roller 46 which is positioned adjacent the capstan 20. The tape passes from roller 46, about the capstan 20 to idler roller 48 and from thence about idler rollers 50, 52, 54 and 56 to the outer storage reel 26. The above-indicated idler rollers are conventionally supported in a manner well known in the art. For example, rollers 52 and 54 are mounted rotatably upon respective shafts 57 and 58 which, in turn, are supported by an apertured bracket 59 fixed to the base 10.

Figure 4:
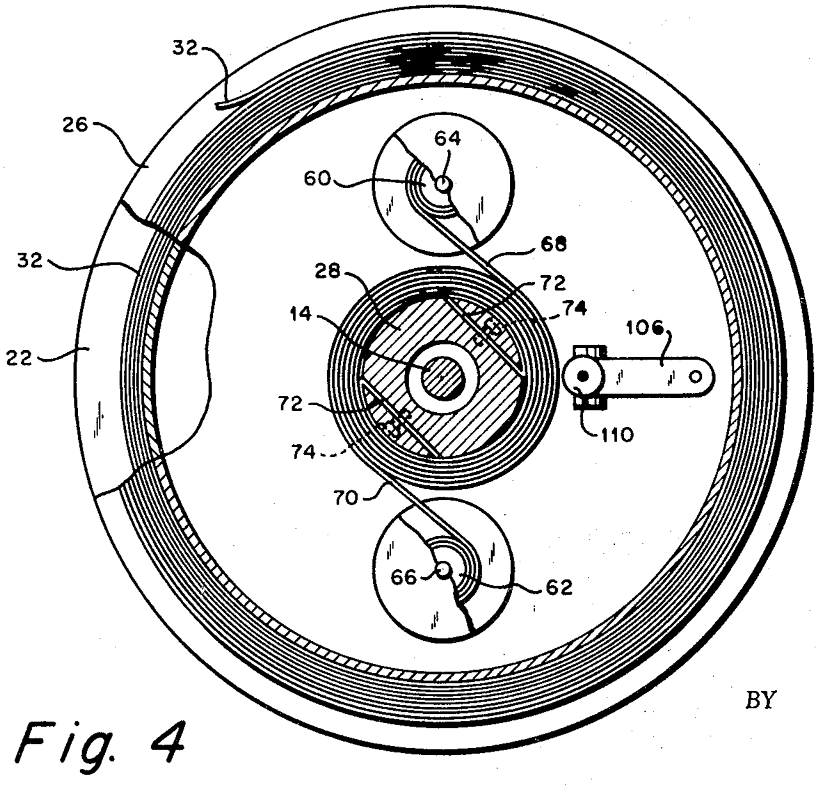
FIG. 4 represents a plan view of the tape recorder of FIG. 1 taken substantially along line 4—4 thereof.

The mechanical linkage between the inner and outer reels 22 and 26 is illustrated in FIG. 4. A pair of constant torque spring storage spools 60 and 62 are each mounted rotatably on respective shafts 64 and 66 which are perpendicularly fixed to the side of reel 22 adjacent reel 26 in a symmetrical arrangement on either side of the axis of the reel 22. Each of the spools 60 and 62 has fixed thereto one of the ends of a respective constant torque spring 68 and 70, the springs being arranged so as to tend to wind upon themselves about their respective spools 60 and 62. The hub 28 of reel 26 includes parallel slots 72 and respective countersunk screws 74 which extend transversely across the slots 72. The other ends of the springs 68 and 70 have apertures which are positioned in the slots 72 to receive therethrough the screws 74 whereby these other ends of the springs 68 and 70 are fixed to the hub 28 of the reel 26. It is to be noted that the springs 68 and 70 are each wound upon themselves about the hub and about their respective spools 64, 62 in the same direction, i.e., when any of the spools and the hub is rotated clockwise, the springs connected thereto tend to collect thereabout.

The radial thickness of the portion of the springs 68 and 70 which is wound upon each other about the hub 28 are related to the relative amounts of tape on the reels 22 and 26. For example, in the preferred embodiment illustrated, the springs 68 and 70 are wound relatively about the hub 28 and about their respective spools 60 and 62 so that when the reels 22 and 26 carry equal amounts of tape 32 the hub 28 carries a minimum number of turns of the springs 68 and 70. Conversely, when the supply of tape 32 carried by either one of the reels 22 or 26 is almost exhausted, the hub 28 carries a predetermined maximum number of turns of the springs 68 and 70, and the radial thickness of the portion of the springs 68 and 70 wound upon each other about the hub 28 is at a maximum.

Generally, rotation of the capstan 20 by the motor shaft 14 causes tape 32 to be withdrawn from one of the tape reels 22 or 26 and fed to the other of the reels. Withdrawing tape from one reel enables the driving force produced by the springs 68 and 70 to cause the other reel to rotate at an angular speed sufficient to take up all of the tape 32 being fed thereto from the capstan 20 and, thereby, to maintain a sufficient and constant degree of tension on the tape 32.

For example, referring to FIG. 4, when the capstan 20 is being rotated clockwise (counterclockwise as shown in FIG. 3), tape 32 is withdrawn from the outer reel 26 thereby causing reel 26 to be rotated clockwise at an angular speed which is dependent upon the instantaneous radius of the tape-covered periphery of the reel 26, which radius, in turn, obviously depends upon the amount of tape peripherally carried by the reel 26. The tendency of the springs 68 and 70 linked between the reels 22 and 26 to wind themselves upon their respective spools 60 and 62 normally causes the outer reel 26 to tend to be rotated counterclockwise relative to reel 22. since the outer reel 26 is being rotated clockwise, the springs 68 and 70 cause the inner reel 22 to be rotated clockwise which enables the inner reel 22 to collect the tape being fed from the capstan 20. It is to be noted that the inner reel 22 is free to rotate under the spring force to the extent limited by the linear speed of the tape 32 being fed thereto. It is to be further noted that the tape tension is primarily a factor of the force exerted by the springs 68 and 70 which force remains constant irregardless of the amount of each spring which is wound upon itself about its spool.

Conversely, when the capstan twenty of FIG. 4 is being rotated counterclockwise, tape 32 is withdrawn from the inner reel 22 causing it to rotate counterclockwise. The springs 68 and 70 cause the outer reel 26 to be rotated in a counterclockwise direction at an angular speed which is limited by the linear speed of the tape being fed to the outer reel 26.

Assuming that the clockwise rotating outer reel 26 is carrying most of the tape 32, the inner reel 22 is of necessity being rotated at a greater angular speed than is the outer reel 26 in order to maintain a constant linear tape speed without breaking the tape. Since the inner reel 22 is rotating at the greater angular speed, the springs 68 and 70 tend to unwind themselves from the hub 28 and rewind themselves upon the spools 60 and 62, thereby decreasing the width of the wound portion of the springs carried by the hub 28.

At some point in time, the relative rates of rotation of the reels become equal when equal amounts of tape are stored on the reels 22 and 26. As indicated above, at this point in time the hub 28 has a minimum number of turns of springs 68 and 70 disposed thereabout. Thereafter, as the outer reel 26 continues to pay out tape 32 being withdrawn by the capstan 20, the outer reel 26 will be rotated faster than the inner reel 22. Therefore, the springs 68 and 70 will tend to unwind themselves from about the spools 60 and 62 and wind themselves upon each other about the hub 28.

At a later point in time, the supply of tape 32 will have been transferred, as above described, from the outer reel to the inner reel 26, and the hub 28 will again contain the maximum arbitrary number of turns of the springs. In a manner hereinafter more fully set forth, the direction of rotation of the capstan 20 is reversed to counterclockwise. The capstan 20 begins to withdraw tape from the inner reel 22 and supply it to the outer reel 26 which, in turn, is caused to rotate counterclockwise by reason of the tendency of the springs 68 and 70 to return to the supply rolls 60 and 62, and thereby to cause the hub 28 to rotate counterclockwise.

In keeping with a purpose of providing a tape recorder having precision speed control and the capability of continual recording of data, the oldest recorded data being erased and replaced by the newest data being recorded, it is desirable that the magnetic tape 32 carry three information tracks, one of which has prerecorded thereon speed control information such as a series of precisely spaced clock pulses. Referring to FIG. 2, the recorder includes a pair of dual element magnetic recording heads 80 and 82 and a single element magnetic recording head 84, each head having a pair of slotted flanges 86 carried by a base abutting surface thereof and being fixed to the base 10 as by screws 88 extending into cooperating threaded apertures in the base 10 through the slotted flanges 86. The heads 80, 82 and 84, thereby, are positioned in the necessary recording, erasing and/or reading proximity to the tape-carrying periphery of the capstan 20.

As shown in FIG. 5 the periphery of the capstan 20 includes a rim 90 constructed of a resilient material having a sufficient coefficient of friction to insure a positive driving engagement with the tape 32. The periphery of the rim 90 includes three spaced peripheral grooves, each of which is arranged to register with a corresponding one of the information tracks carried by the tape 32.

The head 80 includes a pair of elements 92 and 94 radially positioned to operatively register with corresponding ones of the information tracks. The grooves of the rim 90 provide clearance for compliance of the tape 32 and enable a reliable contact of the elements with the tape with minimum drag. Since the tape 32 is wrapped partially about and is supported in close proximity to the head elements of the nonfloating capstan 20, the recorder is not subject to flutter and "wow" such as occurs when a magnetic tape is brought into operative engagement with a recording head element by varying pressure from floating members. The degree of pressure applied by the heads 80, 82 and 84 may be adjusted by loosening the screws 88 and adjusting the radial position of the heads as by a vernier screw, not shown. Each of the dual element heads 80 and 82 has a pair of elements which are positioned respectively adjacent the two outer information tracks carried by the tape 32, while the single element, not shown, of head 84 is positioned adjacent the center track which has recorded thereon the above-indicated clock pulses.

The tape recorder further includes a limit switch mechanism for providing an electrical signal indicating that the supply of tape 32 carried by one or the other of the reels 22 or 26 has been exhausted. A switch 100 is fixed on the base 10 adjacent reel 22 and has a pivotable actuating post 102 extending therefrom toward the reel 22. An arm 104 having its outer end fixed to the extended end of post 102 is positioned parallel to and adjacent the confronting surface of the interior reel 22. The interior reel 22 carries an actuating member including a radially extending lever arm 106 which is positioned between the reels 22 and 26 and has its inner end pivotally mounted on reel 22. A shaft 108 is fixed to and extends from the inner end of lever arm 106 and provides support for a roller 110 mounted rotatably thereon. The lever 106 is so mounted on reel 22 that the roller 110 is positioned adjacent the spring carrying periphery of the hub 28 of the outer reel 26. A pin 112 is fixed to the outer end of the lever arm 106 and extends toward and into an aperture 114 formed in the surface of the reel 22 which confronts the arm 104. A compression spring 116 is positioned to extend between the confronting surface of the inner reel 22 and the lever arm 106 intermediate its ends. As the more and more turns of the springs 68 and 70 are wound upon themselves about the hub 28 of the reel 26, the roller 110 is engaged by the wound portion of the springs and is gradually forced radially outwardly as the width of the wound portion increases, thereby causing the insertion of the pin 112 through the aperture 114. The length of pin 112 is such that, when the selected maximum number of turns of spring about the hub 28 is reached, the extended end of the pin 122 is positioned to contact the arm 104 during rotation of the reel 22 whereby the switch 100 will be actuated. From the above description is is apparent that the arm 104 will be moved in a direction corresponding to the direction of the rotation of the reel 22. Consequently, the switch 100 is able to provide a signal each time the tape supply has been exhausted from either of the reels 22 or 26.

As used in an underwater acoustic noise monitoring system, it is desired that the recorder be so controlled that acoustic data is continually being recorded except when playback is ordered by remote command. Playback at high speed permitting time compression of the recorded data is also desirable. Precision control of the recording and playback speeds is essential in order that an exact duplication of the recorded data may be accomplished.

Figure 6:
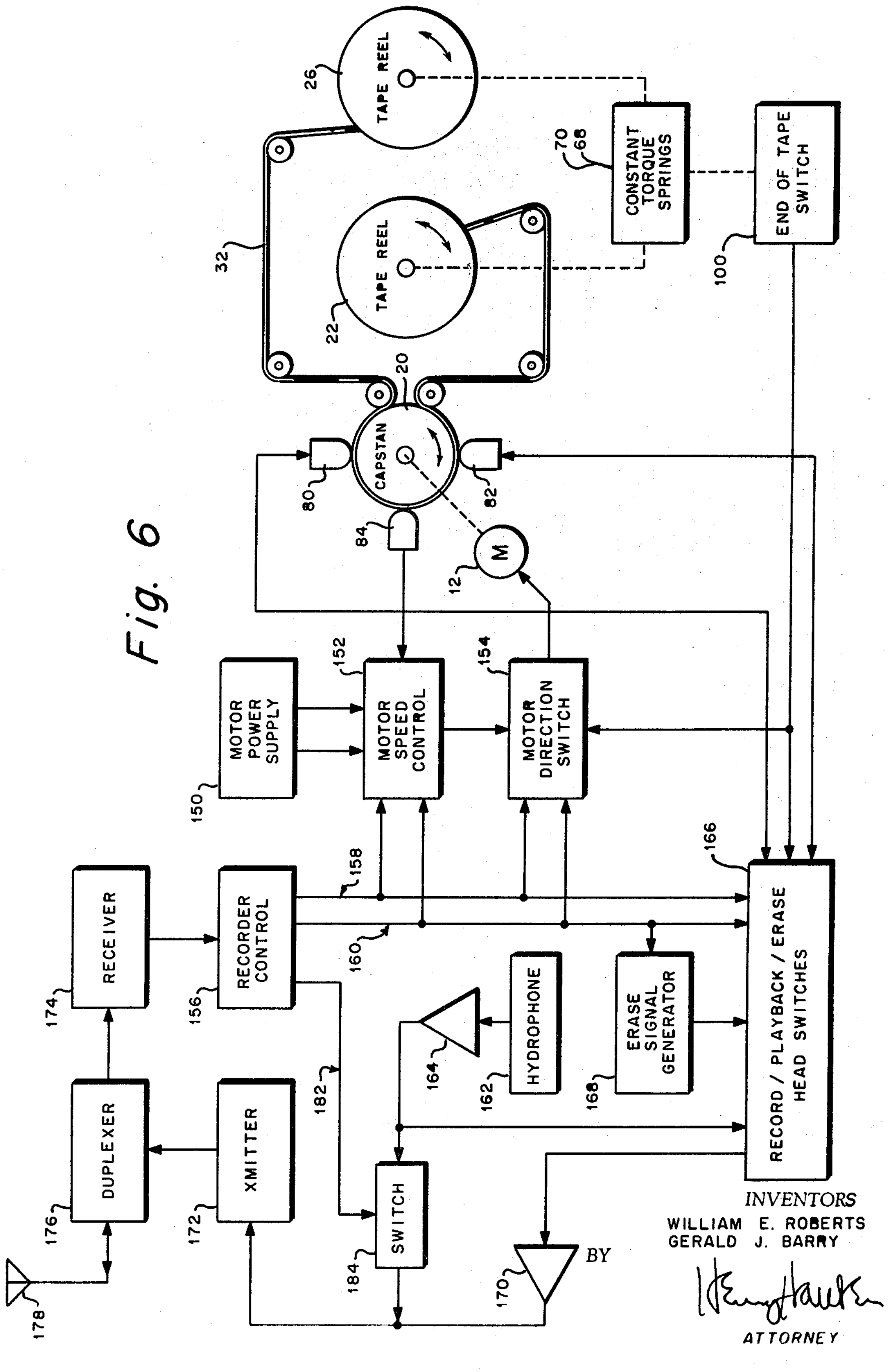
FIG. 6 is a schematic and block diagram of an embodiment of a tape recording system according to the invention including a tape recorder of FIG. 1.

Referring to FIG. 6, a motor power supply 150 provides high and low voltages to a motor speed control circuit 152. The speed control 152 selects one of the voltages and modifies its amplitude to provide the requisite motor driving voltage which is fed to a motor direction switch 154 which, in turn, directs the driving voltage to a selected appropriate power input terminal of the motor 12.

In the normally occurring recording mode, the speed control 152 initially selects the lower of the two voltages received from the power supply 150 and more precisely controls its amplitude as by a conventional servo control circuitry, not shown, which functions in response to the frequency of clock pulses being read by the head 84 to provide the motor 12 with a precisely controlled voltage that will cause the motor shaft 14 and the capstan 20 to rotate at the selected recording speed.

The direction switch 154 is connected to receive from switch 100 the signal that the supply of the tape on one or the other of the reels 22 and 26 has been exhausted and is actuated thereby to direct the voltage from the speed control 152 to the other motor input terminal and, thereby, change the direction of motor rotation.

In the recording mode, a recorder control circuit 156 normally provides a record signal to the speed control 152 and to the direction switch 154 as through conductors 158. Similarly, the recorder control 156 provides through conductors 160 a playback signal to the direction switch 154 which, in turn, is activated thereby to cause the motor 12 to reverse its direction of rotation. The playback signal is also fed to speed control 152 which causes the motor speed to be adjusted upwardly to the selected playback speed.

A hydrophone 162 is appropriately positioned to underwater to sense acoustic data, and its output is fed to an amplifier 164 for amplification. A record/playback/erase switch bank 166 is connected to receive the amplified hydrophone output from amplifier 164, the playback and the record signals from the control 156, and an erase signal from a normally operating erase signal generator 168 which is arranged to have no effective output in response to reception of the playback signal fed thereto from the control 156. The switch bank 166 is also electrically connected to the elements of the heads 80 and 82 and functions during the recording mode to direct the amplified hydrophone output and the erase signals to the appropriate elements of those heads as dictated by the direction of rotation of the capstan 20 which drives the tape 32 past these heads and functions during the playback mode to feed the recorded information being read by the appropriate element through an amplifier 170 to a transmitter 172.

For example, let it be assumed that the acoustic noise sensed by the hydrophone 162 is to be recorded on the magnetic tape information track which is adjacent the reel 22 when the capstan is being rotated clockwise and that the noise is to be recorded on the tape information track adjacent the base 10 when the capstan 20 is being rotated counterclockwise. Therefore, in the recording mode during clockwise capstan rotation, the logic of the switch bank 166 is such that the erase signal from generator 16 is diverted by switches in the bank 166 to element 92 of the head 80. Similarly, the switches cause the diversion of the amplified signal from the hydrophone 162 to the corresponding element of head 82. No signals are diverted to element 94 of head 80 and the corresponding element of head 82. Conversely, for counterclockwise capstan rotation which would begin to occur when the supply of tape 32 on real 26 becomes exhausted, the switch bank 166 diverts the amplified hydrophone output signal to element 94 of the head 80 and diverts the erase signal to the corresponding element of head 80 positioned to register with the tape information track adjacent base 10. In this case, element 92 and the corresponding element of head 82 receive no signals. Thereby, the recorder is capable of continuously recording acoustic data as it is sensed by the hydrophone 162, the oldest recorded data being erased as it is replaced by the newest data being recorded.

In order that the recorded data may be remotely utilized, the recording system also includes, in addition to the transmitter 172, a receiver 174. The transmitter 172 and receiver 174 are each connected through a duplexer 176 to an antenna 178. Upon reception from the antenna 178 of an appropriate command signal from a data retrieval station on an airplane or a ship, the receiver 174 produces a corresponding command signal which is fed to the control 156. As indicated, the playback control signal is fed from control 156 to the motor speed control 152 and to the motor direction switch 154 whereby the rotation of the capstan 20 is immediately reversed in direction and is speeded up. The playback control signal is also fed to the switch bank 166 so that the appropriate element of the heads 80 or 82 which was in a recording state immediately previous to the reception of the playback control signal is now transferred into a reading state and the recorded information is read by the element and diverted by the switch bank 166 to the amplifier 170. The data amplified being played back at high speed in reverse sequence is fed to the transmitter 172 for transmission by the antenna 178 to the recorder monitoring aircraft or vessel. Simultaneously, the playback control signal has been fed to the erase signal generator 68 to block the passage of the erase signal through the switch bank 166 to any of the heads 180 or 182 so that the possibility of the recorded data being erased prior to playback is eliminated.

It is often desirable that the acoustic data being recorded by the recorder also be selectively transmitted to the recorder monitoring aircraft or vessel. To this end the receiver 174 is also sensitive to the listen command signal to actuate the control 156 to provide a listen signal through a conductor 182 to the control terminal of a switch 184 which is connected to establish a conduction path between the output terminal of the amplifier 164 and the input terminal of the transmitter 172. Thereby, the information which is being sensed by the hydrophone 162 and which is being recorded on the tape 32 is simultaneously being transmitted to the data retrieving station.

The above-described remotely actuatable recording system according to the invention enables the precise duplication of data sensed and makes possible both the continuous monitoring and recording of underwater acoustic data and time-compressed retrieving of the data. It is to be noted that the use of extraneous spring loaded pressure wheels and the use of extraneous mechanical linkages interconnecting the conventional tape drive motor and the tape drive capstan and tape storage reels have been eliminated. Further, tape tension remains constant throughout recording and playing back at high and low speeds. The invention enables the production of compact, lightweight, rugged tape recorders in which the disadvantages of the prior art have been substantially eliminated.

It should be understood, of course, that the foregoing disclosure relates only to a preferred embodiment of the invention and that numerous modifications or alterations may be made without departing from the spirit and scope of the invention as set forth in the appended claims.

What is claimed is:

1. A tape transport mechanism comprising:

a base;

a motor fixed to said base;

a tape driving capstan connected to said motor for driven rotation;

a shaft carried by said base;

a first tape storage reel mounted rotatably on said shaft;

a second tape storage reel mounted rotatably on said shaft in a position adjacent to and coaxially of said first reel for relative relation, said second reel including an axial hub extending toward said first reel;

a spring storage spool carried rotatably by said first reel and positioned adjacent said axial hub;

a constant torque spring having one end fixed to said spool and the other end fixed to said hub, said spring tending to wind upon itself about one of said spool and said hub;

a plurality of tape guiding rollers mounted rotatably on said base and arranged to guide tape from said reels to said capstan;

a length of magnetic tape carried by said reels and said rollers and having its ends fixed to respective ones of said reels and having a portion thereof intermediate said ends disposed about a portion of the periphery of said capstan in driveable engagement therewith, the supply of said tape being distributed on said reels relative to the amount of spring wound about said hub so that a predetermined limited amount of spring is wound thereabout each time and only when the tape supply is exhausted from either one of said reels;

limit switch means responsive to said predetermined amount of said spring being wound about said hub for providing an electrical reversing signal; and motor direction control means electrically connected to said motor means and to said limit switch means, and responsive to each said reversing signal for actuating a reversal of direction of rotation of said motor.

2. A tape recorder for recording information on a length of magnetic tape having a plurality of parallel, longitudinally extending information tracks thereon comprising:

a tape driving capstan adapted for drivingly engaging a portion of the magnetic tape when disposed about a portion of said capstan, said capstan including a tape driving peripheral rim of resilient material, said rim including a plurality of parallel, coaxial annular grooves formed about its lateral periphery and each positioned to register with respective information tracks carried by the tape disposable thereabout; and magnetic recording head means including a plurality of recording elements each positioned to entrap the tape between said capstan and said respective element for recording registration with a respective information track on a portion of the magnetic tape disposed about said portion of said capstan and for urging the confronting portion of the information track into the confronting annular groove.

3. A tape recorder for recording information on a length of magnetic tape having at least one information track thereon comprising:

a motor having a drive shaft extending therefrom;

a tape driving capstan fixed to said shaft for rotation therewith and adapted for drivingly engaging a portion of the magnetic tape when disposed about a portion of said capstan;

a first magnetic recording head positioned adjacent said capstan and having a first recording element positioned to entrap the tape between said capstan and said element for recording registration with an information track on a portion of the magnetic tape disposed about said portion of said capstan;

a first tape storage reel mounted rotatably on said drive shaft;

a first spring storage spool carried by said first reel on one side thereof in spaced relation to the axis of rotation of said reel;

a second tape storage reel mounted rotatably on said drive shaft and having an axial hub extending toward said first reel and positioned adjacent said first spool; and a first constant torque spring having one end fixed to said first spool and the other end fixed to said hub, said first spring tending to wind upon itself about either said first spool or said hub.

4. A tape recorder according to claim 3 further comprising:

a second spring storage spool carried rotatably by said first reel on said one side in spaced relation both to said axis of said first reel and to said first spool; and a second constant torque spring having one end fixed to said second spool and the other end fixed to said hub, said second spring tending to wind upon itself about either said second spool or said hub.

5. A tape recorder according to claim 4 further comprising:

said first and second springs each have said other ends wound upon each other about said hub and each are arranged to tend to wind themselves about their respective spools; and said first and second spools and said hub each tend to collect said first and second springs thereabout when rotated relative to said first reel in a same direction.

6. A tape recorder according to claim 3 further comprising:

a base having said motor fixed thereto; and a plurality of tape guiding rollers mounted rotatably on said base and arranged to guide tape from said reels to said capstan.

7. A tape recorder according to claim 6 further comprising:

limit switch means responsive to a predetermined amount of said first spring being wound about said hub for providing an electrical signal; and motor direction control means electrically connected to said motor and to said limit switch means, and responsive to said signal for actuating a reversal of direction of rotation of said motor.

8. A tape recorder for recording information on a length of magnetic tape having an information track thereon comprising:

a base;

a rotatable shaft carried by said base;

a first tape storage reel mounted rotatably on said shaft;

a spring storage spool carried by said first reel on one side thereof in spaced relation to the axis of rotation of said reel;

a second tape storage reel mounted rotatably on said shaft and having an axial hub extending toward said first reel and positioned adjacent said spool;

a constant torque spring having one end fixed to said spool and the other end fixed to said hub, said spring tending to wind upon itself about either said spool or said hub;

a motor fixed to said base;

a tape driving capstan connected to said motor for driven rotation thereby and arranged for drivingly engaging a portion of the magnetic tape when disposed about a portion of said capstan;

a plurality of tape guiding rollers mounted rotatably on said base and arranged to guide tape from said reels to said capstan;

a magnetic recording head positioned adjacent said capstan and having a recording element positioned to be in recording registration with the information track on the magnetic tape when the tape is disposed about said portion of said capstan;

a switch for providing an electrical signal mounted upon said base and having a pivotable actuating arm positioned adjacent one of said first and second reels;

said one reel having an aperture extending through the side thereof confronting said actuating arm;

mechanical actuating means pivotally mounted intermediate its ends on the side of said one reel which confronts the other said reel, said means having one member extending adjacent said hub and positioned for engagement by said spring wound about said hub and movable thereby and having another member which extends through said aperture and into operative engagement with said actuating arm in response to the movement of said one member caused by a predetermined amount of said spring being wound upon said hub; and motor direction control means electrically connected to said motor and to said switch, and responsive to said electrical signal for actuating a reversal of direction of rotation of said motor.

9. A tape recorder for recording information on a length of magnetic tape having a pair of parallel information tracks comprising:

a base;
a pair of tape storage reels each mounted rotatably on said base;
a motor means fixed to said base;
a tape driving capstan connected to said motor means for driven rotation thereby and arranged for drivingly engaging a portion of the magnetic tape when disposed about a portion of said capstan;
a plurality of tape guiding rollers mounted rotatably on said base and arranged to guide tape from said reels to said capstan;
limit switch means arranged for providing an electrical signal when a supply of tape has been exhausted from any one of said tape storage reels;
motor direction control means electrically connected to said motor means and to said limit switch means, and responsive to said electrical signal for actuating a reversal of the direction of rotation of said capstan;
a first recording head positioned on said base adjacent said capstan, said head having first and second recording elements each positioned to be in recording registration with a respective one of the information tracks on the magnetic tape when the tape is disposed about said portion of said capstan;
a second head having first and second recording elements each positioned to be in recording registration with a respective one of the information tracks on the magnetic tape when the tape is disposed about said portion of the capstan;
data sensor means providing an electrical data signal;
generator means providing an electrical erase signal;
switch bank means connected to said limit switch means, said data sensor means and said generator means for receiving said respective signals thereof, said switch bank means being connected to each of said elements of said heads for diverting said erase signal to said first element of said first head which is first encountered by the tape in response to rotation of said capstan and diverting said data signal to said first element of said second head positioned to be in registration with the same track and said switch bank means further being responsive to said signal of said limit switch means for diverting said data signal to said second element of said first head and said erase signal to said second element of said second head.

10. A tape recorder according to claim 9 wherein:
said motor means includes a motor having a drive shaft;
said capstan is fixed to said drive shaft for rotation therewith;
said tape storage reels are each mounted rotatably on said drive shaft; and
said tape recorder further includes a hub mounted rotatably on said drive shaft between said reels and fixed to one of said reels, a spring storage spool mounted rotatably on the other of said reels and positioned adjacent said hub, and a constant torque spring having its ends fixed respectively to said spool and to said hub, said spring tending to wind upon itself about any one of said spool and said hub.

11. A tape recorder according to claim 10 further comprising:
a length of magnetic tape carried by said reels and said rollers and having its ends fixed to respective ones of said reels and having a portion thereof intermediate said ends disposed about a portion of the periphery of said capstan in driveable engagement therewith, equal portions of said tape being carried by said reels when said hub has a predetermined minimum amount of said spring wound thereabout, said tape having a pair of information tracks and a third track having a series of clock pulses prerecorded thereon;
a third recording head positioned on said base adjacent said capstan, said head having an element positioned to be in reading registration with said third track for providing an electrical clock signal;
power supply means providing a rough motor driving voltage; and
motor speed control means connected to said power supply means for receiving said voltage and connected to said third head for receiving said clock signal thereof, said control means modifying said rough voltage for providing a precise motor driving voltage adapted for driving said motor at a selected speed;
said motor direction control means being connected to said motor speed control means for diverting said precise motor driving voltage to said motor.

12. A tape recorder according to claim 9 further comprising:
a length of magnetic tape carried by said reels and said rollers and having its ends fixed to respective ones of said reels and having a portion thereof intermediate said ends disposed about a portion of the periphery of said capstan in driveable engagement therewith, said tape having a pair of information tracks and a third track having a series of clock pulses prerecorded thereon;
a third recording head positioned on said base adjacent said capstan, said head having an element positioned to be in reading registration with said third track for providing an electrical clock signal;
power supply means providing a rough motor driving voltage; and
motor speed control means connected to said power supply means for receiving said voltage and connected to said third head for receiving said clock signal thereof, said control means modifying said rough voltage for providing a precise motor driving voltage adapted for driving said motor means at a selected speed;
said motor direction control means being connected to said motor speed control means for diverting said precise motor driving voltage to said motor means.

13. A tape recorder according to claim 12 further comprising:
means responsive to a remotely transmitted signal and connected with said motor speed control means, said motor direction control means, said erase signal generating means and said switch bank means for providing thereto an electrical playback control signal; and
data transmission means connected with said switch bank means; and wherein
said power supply means provides an additional rough motor driving voltage;
said motor speed control means is additionally connected to said power supply means for receiving said additional rough motor driving voltage, and said motor speed control means is responsive to said playback control signal for modifying said additional rough voltage and for providing to said motor direction control means a second precise motor driving voltage adapted for driving said motor at a second selected speed greater than the first said selected speed;
said motor direction speed means is responsive to said playback control signal for reversing the direction of rotation of said motor;
said erase signal generating means is responsive to said playback control signal for ceasing to provide an erase signal to said switch bank; and
said switch bank means is responsive to said playback control signal for ceasing to provide one of said elements with said data signal and for diverting to said data transmission means a signal from said one of said elements.

14. A tape transport mechanism comprising:
a base;
a motor fixed to said base;
a tape driving capstan connected to said motor for driven rotation;
a shaft carried by said base;
a first tape storage reel mounted rotatably on shaft shaft;
a second tape storage reel mounted rotatably on said shaft in a position adjacent to and coaxially of said first reel for relative rotation, said second reel including axial hub extending toward said first reel;

a spring storage spool carried rotatably by said first reel and positioned adjacent said axial hub;
a constant torque spring having one end fixed to said spool and the other end fixed to said hub, said spring tending to wind upon itself about one of said spool and said hub;
a plurality of tape guiding rollers mounted rotatably on said base and arranged to guide tape from said reels to said capstan;
a switch mounted on said base and having a pivotable actuating arm positioned adjacent one of said first and second reels for providing an electrical signal in response to the operation of said arm;
said one reel having an aperture extending through the side thereof confronting said actuating arm;
mechanical actuating means pivotally mounted intermediate its ends on the side of said one reel which confronts the other said reel, said means having one member extending adjacent said hub and positioned for engagement by said spring wound about said hub and movable thereby and having another member which extends through said aperture and into operative engagement with said actuating arm for operation thereof in response to the movement of said one member caused by a predetermined amount of said spring being wound upon said hub; and
motor direction control means electrically connected to said motor and to said switch, and responsive to said signal for actuating a reversal of direction of rotation of said motor.

* * * * *